Figure 1:
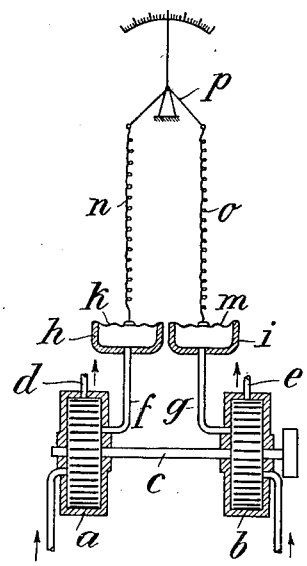

H. GERDIEN.
METHOD OF QUANTITATIVELY ANALYZING GAS MIXTURES OF KNOWN CONSTITUENTS AND APPARATUS THEREFOR.
APPLICATION FILED JULY 18, 1913.

1,133,556.

Patented Mar. 30, 1915.
2 SHEETS—SHEET 1.

Witnesses:
Elsie Swenson
Emil Fisher Jr.

Inventor:
Hans Gerdien,
by Knight Bros
Attorneys.

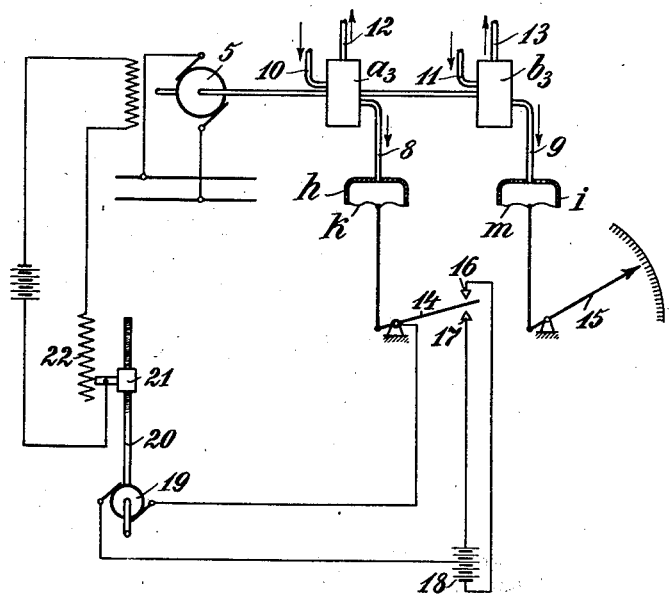

UNITED STATES PATENT OFFICE.

HANS GERDIEN, OF HALENSEE, NEAR BERLIN, GERMANY, ASSIGNOR TO SIEMENS & HALSKE A. G., OF BERLIN, GERMANY, A CORPORATION OF GERMANY.

METHOD OF QUANTITATIVELY ANALYZING GAS MIXTURES OF KNOWN CONSTITUENTS AND APPARATUS THEREFOR.

1,133,556.  Specification of Letters Patent.  Patented Mar. 30, 1915.

Application filed July 18, 1913. Serial No. 779,883.

*To all whom it may concern:*

Be it known that I, HANS GERDIEN, a subject of the German Emperor, and resident of Halensee, near Berlin, Germany, have invented certain new and useful Improvements in Methods of Quantitatively Analyzing Gas Mixtures of Known Constituents and Apparatus Therefor, of which the following is a specification.

My invention, broadly speaking, consists therein that I impart a rotary motion to the gas-mixture to be analyzed, thus creating an increase of gas-pressure from the center toward the periphery of rotation and in that I utilize this increase of pressure for immediately determining the quantity of each constituent of the gas-mixture. This increase of pressure, as well known, may be caused by a centrifuge, by a stowing disk or a similar device which is moved with a known velocity against the gas. In this specification and the annexed drawings I have confined myself to centrifuges for obtaining the effect of generating such pressures of gases, while it is understood that I may employ any other equivalent device. In case the centrifuge is used the pressure is advantageously taken between two points of which one is located near the center and the other in proximity to the periphery of rotation, and the increase of pressure is measured in the well-known manner, for instance by a U-shaped tube filled with mercury. The mercury column then will adjust itself according to the difference of pressure and the difference in the height of the mercury in either shank of the U-shaped tube will then at a given velocity of rotation be dependent upon the constituency of the gas-mixture.

In order to explain more fully the theory of my present invention I wish to state as follows:—According to the experiments of Bredig and Haber, as described in the German periodical "Zeitschrift für Angewandte Chemie", volume 17, pages 452–464, the following relations hold true for gases under the action of centrifugal forces:—

$$\frac{Mv^2}{2} = RT ln\left(\frac{p_r}{p_a}\right).$$

In this formula M is the molecular weight, $p_a$ and $p_r$ are the pressures in the rotating gas at the axis and at the distance $r$, respectively, $v$ is the velocity at the distance $r$, R the gas-constant and T the absolute temperature. From this it may be followed that for a second gas which is simultaneously subjected to the rotation the following relation must also hold true:—

$$\frac{M'v^2}{2} = RT ln\left(\frac{p_{r'}}{p_{a'}}\right).$$

In this formula the pressure taking place at the distance $r$ in the gas-mixture is equal to the sum of the individual pressures $p_r$ and $p_{r'}$ and the pressure at the axis is equal to the sum of the individual pressures $p_a$ and $p_{a'}$. At small velocities $v$ at which, according to experience, no appreciable separation of the individual constituents of the gas-mixture takes place, and therefore no appreciable difference exists between $p_r:p_{r'}$ and $p_a:p_{a'}$, the measure of the difference in pressure between a point near the axis and a point at the distance $r$ from the axis may be used for measuring the average molecular weights of the gas-mixture, and in case the molecular weights of the individual constituents are known for indicating the quantity of each constituent of the mixture. If, for instance, the gas-mixture contain two different constituents, whose molecular weights are respectively designated with $M_1$ and $M_2$, their volume per cents in the mixture with $\alpha$ and $\beta$, and the difference in the height of the mercury columns with $a$, then we will obtain the relation:—

$$a.M_1 + \beta.M_2 = k.a$$

in which $k$ is a constant. Since $\alpha + \beta = 100$, the quantities of the mixture of each gas may be determined from these two equations. A graduation may be made upon the U-shaped tube permitting to read the contents of each individual gas of each gas-mixture. If a gas-mixture contain more than two constituents this method may be carried out in such a manner that first the difference of the pressure of the entire mixture is determined, and thereupon one constituent is absorbed by an absorbing medium, thereupon for the remainder having now only two constituents, the difference in pressure and therewith the constituency is also determined. The difference of pressure for the absorbed constituent can then be indicated from the other differences of pressure, which have been measured, and so forth. Also the gas-mixture to be analyzed, if containing more than two constituents, may be divided and one part led through an absorbing apparatus and thereupon into the device for generating the difference of pressure, while the other part is directly led into a centrifuge, whereby a resistance may be inserted into the connecting tube to the centrifuge, said resistance corresponding to the resistance and contents of the absorbing vessel. In this manner I obtain in either centrifuge differences of pressure corresponding to quantities of gas which are simultaneously taken off.

Besides other purposes, this method may be applied for analyzing smoke-gas, generator-gas or furnace-gas. In such cases also arrangements may be provided for leading the gas through the apparatus in a continuous stream, or also samples of the gas may be taken at intervals.

In order to convey the gas-mixture through the centrifuge as continuously as possible, without causing it to exert an objectionable sucking action thereupon, a choking device is preferably inserted into the tube leading from the centrifuge. In this case always only such a quantity of gas is carried into the centrifuge as can be pressed forward by the choking device.

For rendering the indications independent from pressure and temperature and indicating the result of the measurement in a very simple manner and to avoid corrections and re-checking a test gas or standard gas having a known molecular weight is set in rotation in a second container in unison with the container for the mixture to be analyzed, while both gases are maintained at even temperature and under even pressure. Even temperature, e. g. may be obtained by leading either gas through a cooling vessel before being conveyed into the analyzing apparatus and preferably maintaining the latter also upon even temperature. Even pressure may be attained by causing both gases to act upon different sides of the membrane, which will yield to the action of the higher pressure until the equilibrium takes place between the gas pressures. Another way for securing even pressure is to have the openings of both centrifuges discharge into a common discharge pipe or into the open air. The differences of pressure in the two centrifuges in which the gases are set in rotation are now transmitted upon an indicating mechanism which directly indicates the ratio of the differences of pressure.

I am aware that it is known to indicate the difference of two pressures—that is to say the arithmetical difference of gas pressures at different distances from the center of rotation—in a single apparatus. In the present case, however, the quotient of such differences of pressure has to be indicated. If, for instance, the difference of pressure of one gas be $p_1 - p_2$ and the difference of the other gas may be $p_{1'} - p_{2'}$ then the quotient $$\frac{p_1 - p_2}{p_{1'} - p_{2'}}$$

is the quantity which shall be determined according to my present invention. This quotient corresponds to the ratio of the molecular weights, and if a gas with known molecular weight be taken as a basis, then the average molecular weight of the gas-mixture to be analyzed will be immediately obtained. The ratios of the differences of pressure can be indicated in a number of ways and may be accomplished mechanically or electrically. The two differences of pressure may, for instance, be caused to act upon membrane-manometers or upon manometers containing a liquid and a float, or upon gasometer containers which are connected with a rectangular bell-crank having two even arms in a manner to act as parallel forces thereupon. As a great part of the motions of the membrane will be taken up by the resilient connections to the bell-crank the points of attack at the bell-cranks make only a small motion and the directions of the points of attack at the bell-crank will therefore practically remain parallel to each other. The motion of the bell-crank is transferred mechanically upon a scale or may also be automatically recorded. Instead of a bell-crank, according to the laws of mechanics also a straight double-lever with even arms may be employed, upon which the forces act rectangular to each other for indicating the ratio of said forces. The ratios of the differences of pressure may also be indicated electrically by an electrical quantity, such as resistance voltage or current strength, which is made to vary as a function of the difference of pressure, and the variations of this electrical quantity may be transferred upon an instrument for indicating the ratio of two electrical quantities, for instance upon an instrument of the d'Arsonval type having two coils crossing each other at right angles.

My invention will be more fully understood by reference to the accompanying drawings of which—

Figure 2:
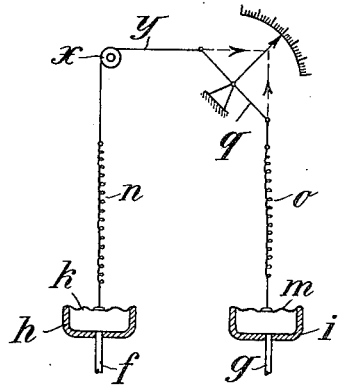
Figure 3:
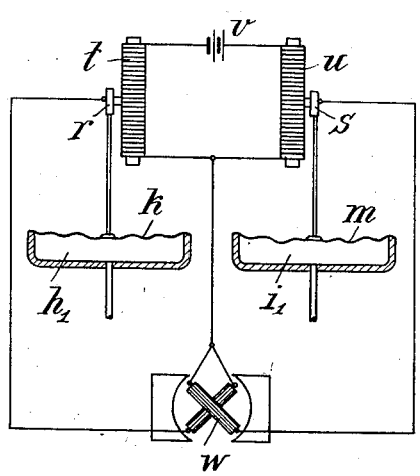
Figure 4:
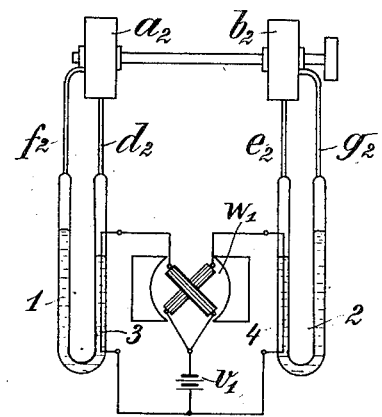

Figure 1 shows an arrangement of two centrifuges which are driven in unison, one being used for a standard or test gas, the other for the gas-mixture to be analyzed, the ratio of the differences of pressure being transmitted upon an indicating device, Fig. 2 a modification of the indicating device of Fig. 1, Fig. 3 an arrangement whereby the indication of the constructions of Figs. 1 or 2 is obtained electrically, Fig. 4 a modified form of the electrical scheme shown in Fig. 3 and of which Fig. 5 is a modification of the arrangement of Fig. 1 in that a regulation is employed for the speed of the centrifuges in dependence from the pressure of the standard or test gas.

Referring now more particularly to the drawing, in Fig. 1 $a$ and $b$ are two centrifuges mounted upon a common axle $c$. Through the centrifuge $a$ I convey the gas-mixture to be analyzed and through the centrifuge $b$ the standard or test gas. Both gases are set in rotation and thereby a pressure-difference is generated between points at a different distance from the center of rotation. Assuming the gases to be discharging into the open air at $d$ and $e$ the pressure at the periphery at the rotating apparatus will be equal to the atmospheric pressure. A difference of pressure, therefore, will manifest itself as under-pressure relatively to the atmosphere and may be transmitted through the pipes $f$ and $g$ into two containers $h$ and $i$ which are closed by membranes $k$ and $m$, respectively. These membranes will yield under the action of the pressures and transfer their motions through resilient connections such as $n$ and $o$ upon a rectangular bell-crank $p$ having arms of even length, said bell-crank carrying at its center, as shown in Fig. 1 of the drawing, a pointer for indicating the ratio of the above pressure-differences. Instead of directly transmitting the motions of the membranes $k$ and $m$ upon a pointer, of course, further gears for magnifying the motions of the membranes or the deflections of the bell-crank may be interposed.

The bell-crank $p$ of Fig. 1 may be replaced by a double-lever $q$ of Fig. 2 having even arms, and the forces must then be made to attack rectangular to each other. This modification is shown in Fig. 2. In this figure the resilient connection $o$ between the membrane $m$ remains unchanged from that of Fig. 1. The resilient connection $n$ of the membrane $k$, however, is made to attack upon the end of the arm of the lever $q$ rectangularly to the direction of attack of the connection $o$, by providing a roller $x$, over which a cord $y$ is strung in such a way that the end of this cord which is connected to the lever 2 is rectangular to the direction of the forces exerted by the membrane $k$, namely to the direction of the connection $n$. The deflections of this device also will indicate the ratio of the differences of pressure.

In Fig. 3 I have shown an arrangement in which the ratio of the differences of pressure will be indicated electrically. In this case again the gas to be analyzed and the standard or test gas are carried from the centrifuges into two membrane-manometers $h_1$ and $i_1$, respectively. Sliding contacts $r$ and $s$ are connected with the membranes $k$ and $m$, respectively, said sliding contacts contacting with the resistances $t$ and $u$. The resistances are traversed by a constant current from the battery $v$ and the sliding contacts will thus take up the voltage at the resistance at a time included by the sliding contacts and impress the same upon the coils of the d'Arsonval instrument $w$.

Instead of the variations of voltage of a circuit by resistance and sliding contacts another arrangement may be employed especially for higher pressures, such arrangement being shown in Fig. 4. The differences of pressure of the two centrifuges $a_2$ and $b_2$ are transmitted through pipes $d_2$, $e_2$ and $f_2$, $g_2$ into two U-shaped tubes 1 and 2 which are filled with mercury. In one shank of either U-shaped tube a resistance wire 3 and 4 is provided, the ends of either wire 3 and 4 being connected with one of the coils of a d'Arsonval instrument $w_1$ over the battery $v_1$ as shown in the drawing. According to the height of the two mercury columns in the shanks which carry the resistance wire, the free length of the resistance wires will apparently be changed and therewith the resistance of the circuits, the ratio of these resistances and therewith the ratio of the pressure-differences of the two gases being then indicated by the instrument.

Another very practical mode of indicating the quotient of pressure-differences of two gases consists in adjusting the speed of the centrifuges to maintain constancy of the pressure of the standard or test gas so that the deflection of the manometer for the test gas assumes a definite value. The manometer for the other gas may then be calibrated according to molecular weights. This scheme may be reduced to practice by providing a regulating means or governor for regulating the speed of the centrifuge in dependence from the position of the indicating device of the standard or test gas, for instance in such a way that the pointer of the indicating device can move between two contacts in a small distance from each other, so that by closing the one or the other contact the speed of the driving motor for the centrifuges will be increased and decreased, respectively. In this case a definite adjustable difference of pressure at the manometer of the standard or test gas will be maintained independently from the fluctuations of pressure and temperature. If care be taken that the other gas rotating around the same axle is kept under the same pressure and temperature as the standard or test gas, the manometers connected to the same will immediately indicate by their deflection which is proportional to the average molecular weight of the gas-mixtures to be analyzed and therewith to the quantity of each individual constituent of the mixture. In Fig. 5 of the drawing an arrangement of this kind is shown diagrammatically. A centrifuge $b_3$ for the gas to be analyzed and a centrifuge $a_3$ for the test or standard gas are mounted upon a common axle which is driven by a motor 5. At 10 and 11 these gases are led into the centrifuges, it being assumed that for the sake of simplicity the gases after having been centrifuged exhaust into the atmosphere at 12 and 13, so that the pressure at the entrance of the centrifuges will be equal to the atmospheric pressure which exists at the entrance of the centrifuge and therefore also equal to the atmospheric pressure itself. The gases which are conveyed at 8 and 9 to the indicating device will then be at an under-pressure relatively to the atmosphere. The gases are conveyed into containers $h$ and $i$ which are closed by membranes $k$ and $m$, respectively. The motion of the membranes is transmitted upon pointers 14 and 15. The pointer 14 of the indicating apparatus for the standard or test gas can play between two closely adjacent contacts 16 and 17. 18 is a battery and 19 a motor which by means of a threaded spindle 20 and nut 21 serves to insert a greater or smaller part of the resistance 22 into the field circuit of the driving motor 5. If, for instance, the contact 16 be closed by the pointer 14, the motor 5 will be so excited that the resistance will be cut out of circuit, while if contact 17 be closed resistance will be inserted into circuit. The speed of the driving motor 5 will accordingly be kept practically constant or at most be subject to small fluctuations, and the position of the pointer 15 with indicating apparatus for the gas-mixture to be analyzed will then indicate the constituency of the gas-mixture.

In the foregoing I have shown and described only some embodiments of my invention, but I wish to be understood as not limiting myself to the precise constructions as shown since many modifications may be made thereon without departing from the principle or sacrificing any of the advantages of my invention.

I therefore claim and desire to secure by Letters Patent of the United States:—

1. Apparatus for quantitatively analyzing gas mixtures of known constituents, comprising in combination means for rotating a body of gas to develop difference of pressure from the axis outward, and means for directly observing this difference of pressure for determining the quantity of each constituent.

2. Method for quantitatively analyzing a gas-mixture having known constituents, which consists in rotating said gas-mixture in unison with a test or standard gas, and indicating the quantity of each constituent of the mixture by the ratio of the difference of pressure of said test or standard gas to the difference of pressure of said mixture.

3. Method for quantitatively analyzing a gas-mixture having known constituents, which consists in imparting a rotary motion to said gas-mixture to generate a difference of pressure therein and rotating a test or standard gas in unison with said gas-mixture, maintaining either gas at the same temperature and under the same pressure, and indicating the ratio of the differences of pressure of either gas for determining the quantity of each constituent of the mixture.

4. Method for quantitatively analyzing a gas-mixture having known constituents, which consists in imparting a rotary motion to said gas-mixture and rotating a test or standard gas in unison therewith to generate differences of pressure in either gas thereby, maintaining uniformity of said rotary motion, and indicating the molecular weight of said gas-mixture as a multiple of that of said test or standard gas.

5. Method for quantitatively analyzing a gas-mixture having known constituents, which consists in imparting a rotary motion to said gas-mixture and rotating a test or standard gas in unison therewith to generate differences of pressure in either gas thereby, regulating the speed of rotation of said gases upon a constant pressure of said test or standard gas, and indicating the molecular weight of said gas-mixture as a multiple of that of said test or standard gas.

In witness whereof I have hereunto set my signature in the presence of two subscribing witnesses.

HANS GERDIEN.

Witnesses:
WOLDEMAR HAUPT,
HENRY HASPER.